(12) United States Patent
Vinnakota et al.

(10) Patent No.: US 6,789,056 B2
(45) Date of Patent: Sep. 7, 2004

(54) DSP INTERFACE FOR PACKET PROCESSING

(75) Inventors: Bapi Vinnakota, Fremont, CA (US); Sameer Nanavati, Fremont, CA (US); Saurin Shah, Santa Clara, CA (US); Nicholas E. Duresky, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 5 days.

(21) Appl. No.: 10/334,225

(22) Filed: Dec. 31, 2002

(65) Prior Publication Data

US 2004/0136397 A1 Jul. 15, 2004

(51) Int. Cl.[7] .............................................. G06F 13/14

(52) U.S. Cl. .................... 703/22; 709/250; 370/412; 370/236

(58) Field of Search .......................... 710/22; 709/250; 370/412, 230

(56) References Cited

U.S. PATENT DOCUMENTS

| | | | | |
|---|---|---|---|---|
| 5,487,061 A | * | 1/1996 | Bray | 370/252 |
| 5,553,061 A | * | 9/1996 | Waggener et al. | 250/491.1 |
| 6,438,135 B1 | * | 8/2002 | Tzeng | 370/412 |
| 6,687,757 B1 | * | 2/2004 | Ben-Ze'ev et al. | 709/250 |

* cited by examiner

*Primary Examiner*—A. Elamin
(74) *Attorney, Agent, or Firm*—Buckley, Maschoff & Talwalkar LLC

(57) ABSTRACT

A method, apparatus, and system for communicating between a digital signal processor (DSP) and a packet processor.

25 Claims, 3 Drawing Sheets

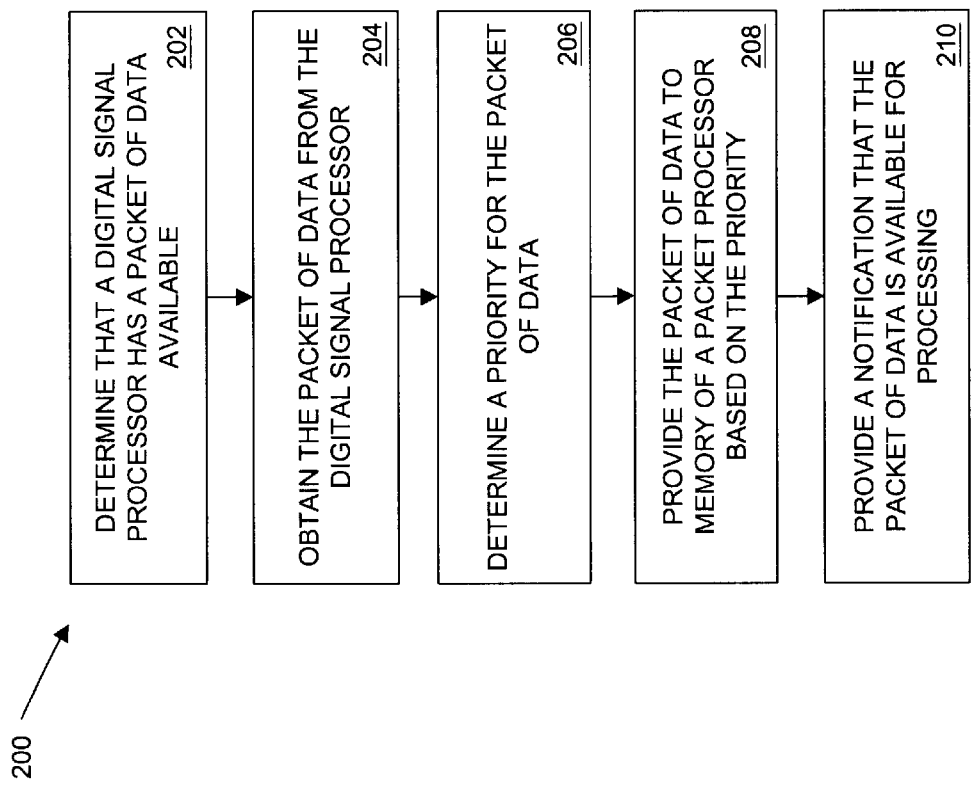

DSP INTERFACE FOR PACKET PROCESSING

BACKGROUND

In some voice over packet (VoP) architectures, a packet processor may communicate with one or more digital signal processors (DSPs). Thus, there may be a need for a system, apparatus, and method for providing and interface between one or more DSPs and the packet processor.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description wherein like reference numerals are employed to designate like parts or steps, when read with the accompanying drawings in which:

FIG. 3 is a flowchart of a first embodiment of a method in accordance with the present invention.

DETAILED DESCRIPTION OF THE INVENTION

Figure 1:
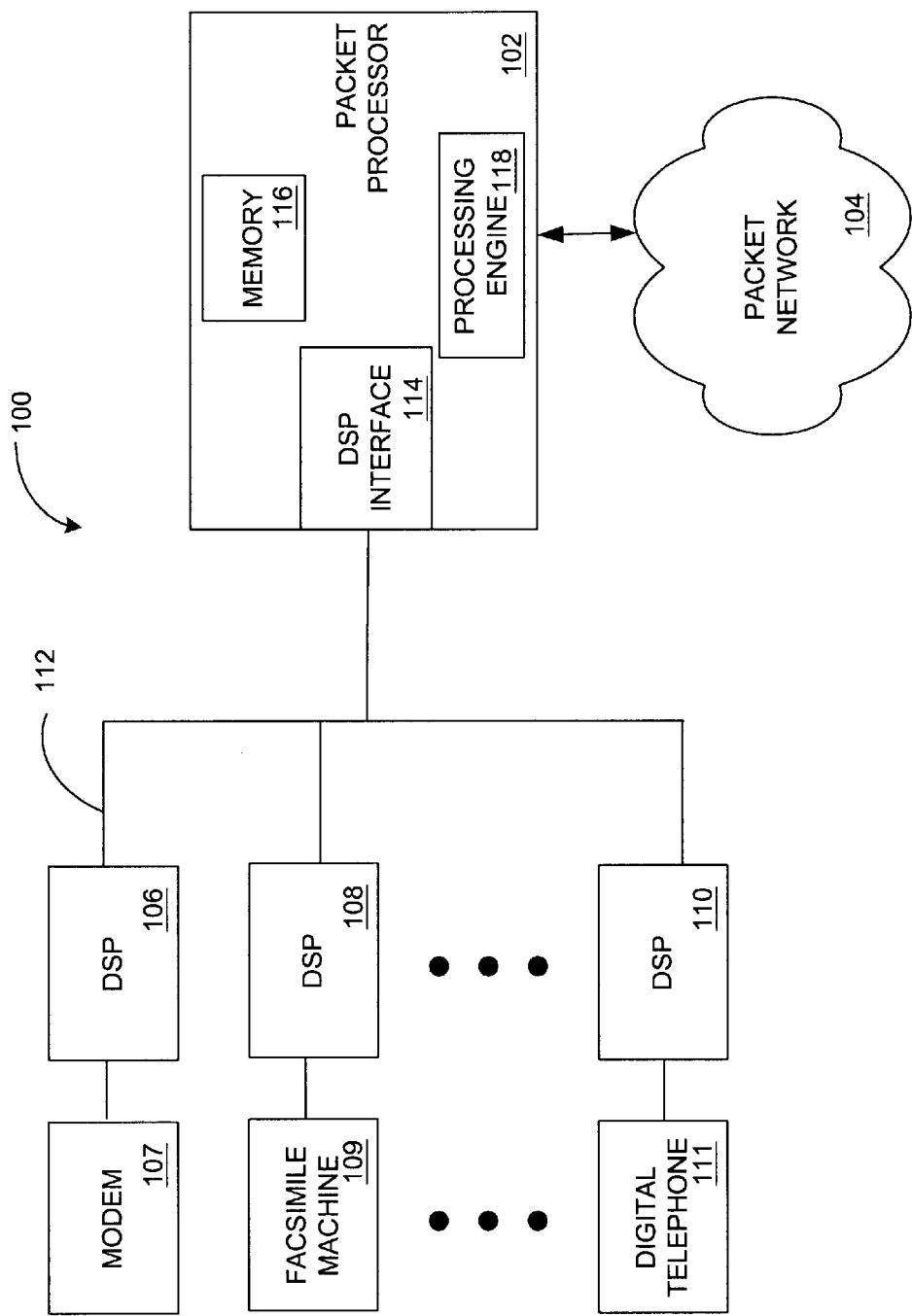
FIG. 1 is a block diagram of an apparatus suitable for practicing an embodiment of the invention.

Reference will now be made in detail to the preferred embodiments of the present invention, examples of which are illustrated in the accompanying drawings. It is to be understood that the Figures and descriptions of embodiments of the present invention included herein illustrate and describe elements that are of particular relevance, while eliminating, for purposes of clarity, other elements found in typical computers and computer networks. Other details, features, and advantages of the present invention will become further apparent in the following detailed description of the embodiments.

Any reference in the specification to "one embodiment," "a certain embodiment," or a similar reference to an embodiment is intended to indicate that a particular feature, structure or characteristic described in connection with the embodiment is included in at least one embodiment of the invention. The appearances of such terms in various places in the specification are not necessarily all referring to the same embodiment.

In the present invention, the term "chip" may include, but is not limited to, any substrate, die, or group of substrates packaged together, on or in which active and/or passive circuit elements are scribed, fabricated, etched, or located; any semiconductor or other material on or in which one or more electronic components or circuits are scribed, fabricated, etched or otherwise formed; an integrated circuit or group of circuits or electronic components; etc.

In the present invention, the terms "digital signal processor" and "DSP" may include, but are not limited to, a chip, component or device designed to perform processing, calculation, transformation, manipulation, compression, decompression, transmission, and/or reception of one or more signals.

In the present invention, the term "engine" may include, but is not limited to, hardware and/or software that performs one or more functions; implements one or more algorithms; uses one or more rules of logic to provide an output for one or more given inputs' accesses memory; stores, transmits, receives, accesses, or obtains data; etc. on behalf of a program, component, device, circuitry block, etc.

In the present invention, the term "packet" may include, but is not limited to, a datagram or any unit or bundle of data that may be organized for transmission. In some embodiments, a packet may include control information (e.g., information regarding the destination, origin, length, etc. of the packet), error detection and correction information, identifier information. A packet may be routed or transmitted between an origin and destination on a packet network.

In the present invention, the term "packet network" may include, but is not limited to, the Internet, an X.25 compliant network, an IP (Internet Protocol) compliant network, a UDP (User Datagram Protocol) compliant network, or other packet switched or connectionless network for communication or routing of data in packets between an origin and a destination.

In the present invention, the term "packet processor" may include, but is not limited to, any chip, integrated circuit, or combination of hardware and/or software that places packets for delivery over a packet network and/or receives packets from a packet network.

In the present invention, the term "processing engine" may include, but is not limited to, a component or other portion of a packet processor that is involved in placing or sending a packet to a packet network or preparing or conditioning a packet for delivery to a packet network.

Referring now to FIG. 1, a system 100 indicative of a first embodiment of the present invention is illustrated. The system 100 includes a packet processor 102 connected directly or indirectly to, or in, communication with, a packet network 104. The packet processor 102 also is connected to one or more DSPs 106, 108, 110 via a bus 112. While the system 100 illustrated in FIG. 1 includes three DSPs, other embodiments of the system 100 may include less than three or more than three DSPS. In addition, in some embodiments, the packet processor 102 may be connected directly or indirectly to, or in communication with, one or more additional packet networks.

In general, the packet processor 102 may provide packets received from a DSP for delivery over the packet network 104. In addition, the packet processor 102 may receive packets from the packet network 102 and provide the packets to one or more of the DSPs 106, 108, 110 via an interface 114. The packet processor 102 may include other components, such as memory 116, one or more packet processing engines 118, etc. The packet processor 102 may include one or more packet processing engines 118 to handle communications from the DSPs 106, 108, 110 to the packet network 104 and/or one or more packet processing engines 118 to handle communications from the packet network 104 to one of the DSPs 106, 108, 110.

More specifically, the DSPs 106, 108, 110 may receive one or more digitized samples or other signals and provide them to the packet processor 102. For example, the DSP 106 may receive a digital sample or data packet from a modem 107, the DSP 108 may receive a digital sample or data packet from a facsimile machine 109, and the DSP 110 may receive a digital packet or data packet from a digital telephone 111. Multiple devices may be in communication with each of the DSPs 106, 108, 110. The DSPs 106, 108, 110 may place digital samples into packets. Each of the DSPs 106, 108, 110 may have many channels that allow data to flow or be transmitted to the DSP. For example, the DSP 106 may have 512 channels associated with it. Each channel may be associated with a different device or electronic address. Upon receiving data from or via one of the channels, a DSP may place the data into a queue for transmission to the packet processor 102 and notify the packet processor 102 of the availability of the packet. Each channel for a DSP may have a priority assigned to it, programmed for it, or otherwise associated with it.

The packet processor 102 may include an interface 114 that facilitates communication by and between the DSPs 106, 108, 110 and the packet processor 102 via the bus 112. The interface 114 may examine packets received from DSPs, assign priorities to the packets and place them into places or logical queues in the memory 116 for subsequent processing by the packet processor 102, which can eliminate the need for examination of the packets by the processing engine 118. In addition, the interface 114 can combine, frame, or modify data received from the DSPs 106, 108, 110 into packets for delivery over the packet network 104, thereby relieving some of the processing burden from the remainder of the packet processor 102.

Figure 2:
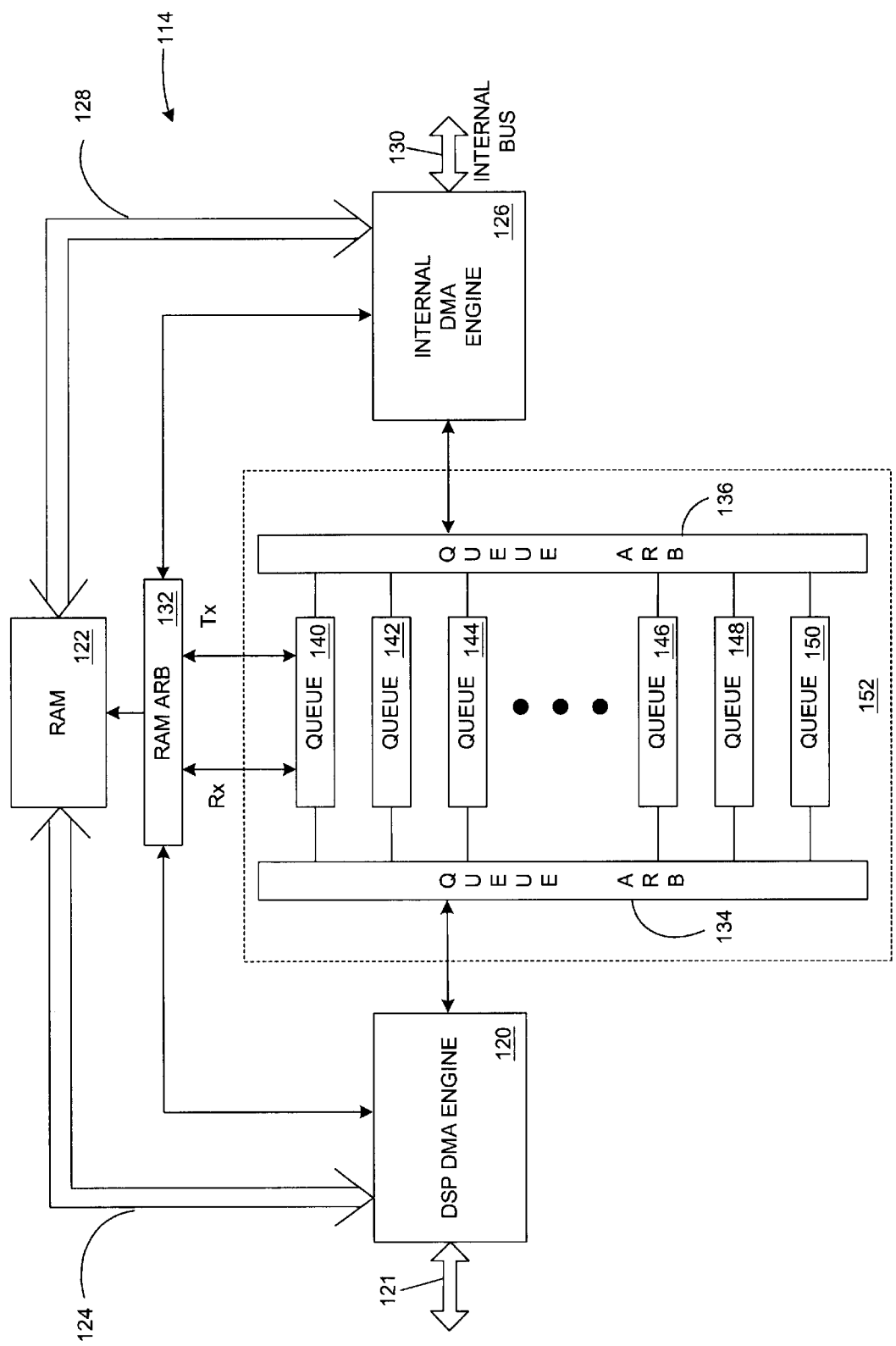
FIG. 2 is a block diagram of the DSP interface of the apparatus of FIG. 1.

Now referring to FIG. 2, the structure of an embodiment of the interface 114 is illustrated in more detail. The interface 114 may include a DSP DMA (Direct Memory Access) engine or other component or circuitry 120 that is connected to or in communication with the bus 112 via bus 121. The DSP DMA engine 120 may facilitate transmission or movement of data between one or more of the DSPs 106, 108, 110 and internal RAM (Random Access Memory) or other memory 122 via bus 124. The DSP DMA engine 120 may include a physical interface between the interface 114 and the bus 112 while decoupling the frequency of signals on the bus 112 from the frequency of signals on the bus 124 and other aspects of the interface 114. The DSP DMA engine 120 also may provide a functionally glue-less interface between the bus 112 and the interface 114. That is, the logic of the DSP DMA engine 120 may couple to the logic of the DSPs 106, 108, 110 and the structure of the DSP DMA engine may create no overhead for any of the DSPs 106, 108, 110 and no intervention or interruption in the normal operation of the DSPS 106, 108, 110.

The interface 114 also may include an internal DMA engine or other component or circuitry 126 that is connected to or in communication with the RAM 122 via a bus 128. In addition, the DMA engine 126 may be connected to or in communication with other parts of the packet processor 102 via a bus 130. The DMA engine 126 may facilitate transmission or movement of data between the RAM 122 and internal packet processing engines, components or other circuitry within the packet processor 102. The DMA engine 126 may include a physical interface between the interface 114 and the bus 130 while decoupling the frequency of signals on the bus 130 from the frequency of signals on the bus 128, the bus 121, or other components of the interface 114. In some embodiments, the engines 120, 126 may be integrated together in the interface 114.

Both the DSP DMA engine 120 and the DMA engine 126 may be connected to or in communication with RAM arbitrator or RAM arbitration engine 132, which may in turn be connected to or in communication with the RAM 122. The RAM arbitrator 132 may coordinate communication between the RAM 122 and the DSP DMA engine 120 and between the RAM 122 and the internal DMA engine 126 so that the engines 120, 126 are not both accessing or using the RAM 122 at the same time.

The interface 114 also may include a queue arbitrator or arbitration engine 134 connected to or in communication with, the DSP DMA engine 120. Similarly, the interface 114 also may include a queue arbitrator or arbitration engine 136 connected to or in communication with the DMA engine 126. Each of the queue arbitrators 134, 136 may be connected to or otherwise control one or more queues 140, 142, 144, 146, 148, 150 that represent places in memory 152 or other logical units in the interface 114 that may be accessed and used by both the DSP DMA engine 120 and the internal DMA engine 126. The different queues 140, 142, 144, 146, 148, 150 may operate or be used in parallel in an independent fashion. The queue arbitrators 134, 136 may coordinate communication between the queues 140, 142, 144, 146, 148, 150 and the DSP DMA engine 120 and between the queues 140, 142, 144, 146, 148, 150 and the internal DMA engine 126 so that the engines 120, 126 are not both accessing or using a queue at the same time. In addition, the queue arbitrators 134, 136 may perform processing specific for data in a packet network. For example, the queue arbitrators 134, 136 may frame data for internal use in the packet processor 102, segregate flows of data between the DSPs 106, 108, 110 and the remainder of the packet processor 102, notify a processing engine 118 when a data transfer is completed, etc.

In some embodiments, each queue 140, 142, 144, 146, 148, 150 may have an associated burst size that controls or sets the amount of time a queue can be accessed by, or in communication with, another resource or component in the interface 114. In addition, each queue may have an associated priority, thereby allowing for different levels of service for different packets associated with different queues. For example, a queue dedicated to control packets may have a higher queue than a queue that services data packets. In addition, each of the queues 140, 142, 144, 146, 148, 150 may have one or more interrupts associated with it that can be triggered or set by the DSP DMA engine 120 and/or the internal DMA engine 126 and serviced by a processing engine 118 or some other part of the packet processor 102. Each interrupt may be unique. Thus, the packet processor 102 can service different interrupts differently.

During operation of the interface system 100, a DSP, such as the DSP 106, may notify the interface 114, or send a signal to the interface 114 that provides such notification, that the DSP 106 has a packet ready for communication to the packet processor 102. However, the interface 114 may not know which channel of the DSP 106 the packet is related to or associated with. The interface 114 then may query, poll, or snoop the DSP 106 to determine the channel associated with the packet and pull the packet from the DSP 106. More specifically, the DSP DMA engine 120 may receive a signal from the DSP 106 that the DSP 106 has a packet available. The DSP DMA engine 120 then may query, poll, or snoop the DSP 106 and retrieve the packet from the DSP 106. In addition, the DSP DMA engine 120 may determine the channel in the DSP 106 that the packet is associated with by querying, polling, or snooping the DSP 106.

Each channel in the DSP 106 may have a priority assigned to it or otherwise associated with it. In some embodiments, the priorities for the different channels in a DSP may be programmable and/or alterable. The DSP DMA engine 120 will determine the priority of the packet based on the channel associated with the packet or other criteria programmed into the DSP DMA engine 120 and either provide the packet to the RAM 122 or directly into memory 152 in the interface 114 (as represented by the queues 140, 142, 144, 146, 148, 150) via the queue arbitrator 134. Different DSP channels may be mapped to different queues in the interface 114 or assigned different priorities.

In some embodiments, if the packet data is moved from the DSP DMA engine 120 into the RAM 122, the RAM arbitrator 132 may notify the internal DMA engine 126 that a packet is stored in the RAM 122. Alternatively, the internal DMA engine 126 may periodically query or poll or access the RAM 122 to determine if packet data is available or stored in the RAM 122. In some cases, the RAM arbitrator 132 may move packet data stored in the RAM 122 into memory in the interface as represented by the queues 140, 142, 144, 146, 148, 150 in the interface 114. The RAM arbitrator 132 or the queue arbitrator 136 may then notify the internal DMA engine 126 accordingly.

In some embodiments, the RAM 122 may be divided into separate buffers that are associated with each of the queues 140, 142, 144, 146, 148, 150. The number of buffers and the size of each buffer in the RAM 122 may be programmable, so that packets of different lengths and latency requirements can be serviced. In addition, a buffer in the RAM 122 may have the same priority as the queue with which it is associated. Thus, the internal DMA engine 126 can determine the priority of the packet stored in the RAM 122 by determining the priority of the buffer in the RAM 122 in which the packet is stored.

When packet data is moved into memory 152 in the interface by either the DSP DMA engine 120 or the RAM arbitrator 132, the packet data preferably is moved into the queue associated with the priority of the packet as determined by the DSP DMA engine 120 or otherwise associated with the channel in the DSP from which the packet came. Each of the queues 140, 142, 144, 146, 148, 150 may be associated with more than one channels in the DSPs 106, 108, 110 so that packets from multiple channels (which may include packets from channels from different DSPs) are stored in each queue.

In some embodiments, if the packet data is moved from the DSP DMA engine 120 into one of the queues 140, 142, 144, 146, 148, 150, the queue arbitrator 136 may notify the internal DMA engine 126 that a packet is stored in one of the queues. Alternatively, the internal DMA engine: 126 may periodically query, poll, or access the queues 140, 142, 144, 146, 148, 150 to determine if packet data is available or stored in one of the queues 140, 142, 144, 146, 148, 150. By placing packet data into one of the queues 140, 142, 144, 146, 148, 150, multiple direct memory access threads can be processed simultaneously and different levels of service can be provided to different packets. In addition, small packets can be grouped together for transmission across the packet network 104 and large packets can be broken down into smaller packets for transmission.

Based on the priority associated with the queue in which a packet is stored, the internal DMA engine 126 may transfer data out of the interface 114 into other memory in the packet processor 102, such as the memory 116, or directly to a processing engine 118. When transferring a packet directly into the memory 116, the internal DMA engine 126 may place the packet into one of multiple (e.g., 2048) flows, queues or memory locations within the memory 116 based on the priority of the queue 140, 142, 144, 146, 148, 150 wherein the packet was stored, the priority associated with the channel in the DSP that provided the packet to the interface 114, or some other criteria. By doing so, the processing engines 118 in the packet processor 102 do not have determine the priority of the packets, poll the interface 114 for packets, control the movement of packets from the interface 114, etc. In addition, the interface 114 can initiate data transfer and communication to the remainder of the packet processor 102 when there are packets from DSPs for the packet processor 102 to process. Thus, the bandwidth on the internal bus 130 may be reduced. In addition, the internal DMA engine 126 may transfer some packets to the memory 116 and some packets directly to a processing engine 118. For example, the internal DMA engine 126 may transfer a data packet into the memory 116 and a control packet directly to one of the processing engines 118.

Once a packet is placed in or provided to the memory 116 or into a processing engine 118, the processing engine(s) 118 may further process the packet and deliver it to the packet network 104.

When the packet processor 104 receives a packet from the packet network 104, a processing engine 118 in the packet processor 104 will examine the packet and map into the specific channel in the specific DSP to which the packet is to be delivered by the interface 114. The processing engine 118 may store the packet into the memory 116. The processing engine 118 may notify the internal DMA engine 126 that data is ready to be transferred across the interface 114 to a DSP. The internal DMA engine 126 may retrieve the packet from the memory 116 and place it into the memory 152 along with the indication of the channel and DSP to which the packet is to go. The DSP DMA engine 120 can then provide the packet to the appropriate channel of the specific DSP via the bus 121.

Now referring to FIG. 3, a first embodiment 200 of a method in accordance with the present invention is illustrated. The method 200 may be performed by the interface 114. Processing begins at 202 during which the interface determines that a DSP (e.g., the DSP 108) has a packet of data available. In some embodiments, the interface 114 may receive a signal or other notification from the DSP that the packet is available. Alternatively, the interface 114 periodically may poll the DSPs 106, 108, 110 to determine if the DSPs 106, 108, 110 have packets of data available.

During 204, the DMA engine 120 in the interface 114 may obtain the packet of data from the DSP. The DMA engine 120 in the interface 114 may retrieve or otherwise pull the packet of data from the DSP upon receiving the notification from the DSP that the packet is available. The DMA engine 120 in the interface 114 also may snoop the DSP to determine a channel associated with or providing the packet of data.

During 206, the interface 114 determines a priority for the packet of data obtained during 204 from the DSP. In some embodiments, 206 may occur prior to 204. Each channel in the DSP may have a priority associated with it that is programmed into the interface 114. Thus, each channel can be status mapped to a priority. By determining the channel in the DSP that is associated with the packet of data, the interface 114 can determine the priority associated with the packet of data. The DMA engine 120 in the interface may assign the packet of data to one of the queues 140, 142, 144, 146, 148, 150 based on the priority of the packet of data.

During 208, the interface 114 stores or otherwise provides the packet of data to memory of the packet processor 102 based on the priority associated with the packet. The memory may be the memory 116 or memory associated with or part of a processing engine 118. As previously discussed above, the memory 116 may include or be associated with a number of queues into which the internal DMA engine 126 can place the packet of data based on the priority associated with the packet of data, availability of bandwidth on the bus 130. For example, the internal DMA engine 126 in the interface may place a data packet in one queue in the memory 116 and a control packet into a different queue in the memory 116, the two different queues having different priorities.

During 210, the interface 114 may provide a signal or other notification to the processing engine 118 or other component in the packet processor 102 that a packet has been placed in the memory 116 or is otherwise available for processing by a processing engine.

While a DSP interface for packet processing apparatus and method has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents. Moreover, although software or hardware are described as performing certain functions, such functions may be performed using software, hardware, or a combination of software and hardware (e.g., a medium may store instructions adapted to be executed by a processor to perform a method of facilitating an transfer of a packet from a DSP to a packet network).

What is claimed is:

1. An apparatus, comprising:
   a packet processing engine;
   a packet processor memory; and
   a digital signal processor interface to exchange packets with a plurality of digital signal processors, the digital signal processor including:
   an interface memory;
   a first component adapted to obtain a packet of data from a digital signal processor, assign a priority to the packet of data, and to place the packet of data in one of a first plurality of queues stored at the digital signal processor interface based, at least in part, on the priority; and
   a second component adapted to provide the packet of data either (i) to one of a second plurality of queues stored at the packet processor memory or (ii) to the packet processing engine based, at least in part, on the priority.

2. The apparatus of claim 1, wherein the interface memory is to be in communication with the first component and second component, and further comprising:
   a memory arbitrator that governs access to the interface memory by the first component and the second component.

3. The apparatus of claim 1, further comprising:
   a first queue arbitrator, the first queue arbitrator adapted to govern access by the first component to the first plurality of queues.

4. The apparatus of claim 3, further comprising:
   a second queue arbitrator, the second queue arbitrator adapted to govern access by the second component to the first plurality of queues.

5. The apparatus of claim 1, wherein the first component is a first DMA engine and the second component is a second DMA engine.

6. An apparatus, comprising:
   a packet processing engine;
   a packet processor memory; and
   a digital signal processor interface to exchange packets with a plurality of digital signal processors, the digital signal processor including:
   an interface memory;
   a first component adapted to obtain a packet of data from a digital signal processor, assign a priority to the packet of data, and to place the packet of data in one of a first plurality of queues stored at the digital signal processor interface based, at least in part, on the priority; and
   a second component in the adapted to place the packet of data into one of a second plurality of queues stored at the packet processor memory based, at least in part, on the one of the first plurality of queues, and to notify the packet processing engine of an availability of the packet of data in the one of the second plurality of queues.

7. The apparatus of claim 6, wherein the interface memory is to be in communication with the first component and second component, and further comprising:
   a memory arbitrator that governs access to the memory by the first component and the second component.

8. The apparatus of claim 6, wherein the first component is a first DMA engine and the second component is a second DMA engine.

9. The apparatus of claim 6, further comprising:
   a first queue arbitrator, the first queue arbitrator adapted to govern access by the first component to the first plurality of queues.

10. The apparatus of claim 9, further comprising:
    a second queue arbitrator, the second queue arbitrator adapted to govern access by the second component to the first plurality of queues.

11. The apparatus of claim 6, wherein the first plurality of queues are created logically in a memory accessible by the first component and the second component.

12. A method, comprising:
    determining that a first digital signal processor has a first packet of data available;
    obtaining the first packet of data from the first digital signal processor;
    determining a priority for the first packet of data;
    providing the first packet of data to memory of a packet processor based, at least in part, on the priority;
    providing a notification that the first packet of data is available for processing;
    receiving a notification that a second packet of data is available in the packet processor;
    determining a channel and a second digital signal processor associated with the second packet of data; and
    providing the second packet of data to the channel in the second digital signal processor.

13. The method of claim 12, wherein the providing a notification that the first packet of data is available for processing includes providing the notification to a processing engine in the packet processor.

14. The method of claim 12, wherein the determining that the first digital signal processor has a first packet of data available includes receiving a signal from the digital signal processor.

15. A medium storing instructions adapted to be executed by a processor to perform a method of facilitating data transfer, the method comprising:
    determining that a first digital signal processor has a first packet of data available;
    obtaining the first packet of data from the first digital signal processor;
    determining a priority for the first packet of data;

providing the first packet of data to memory of a packet processor based, at least in part, on the priority;

providing a notification that the first packet of data is available for processing;

receiving a notification that a second packet of data is available in the packet processor;

determining a channel and a second digital signal processor associated with the second packet of data; and providing the second packet of data to the channel in the second digital signal processor.

16. The medium of claim 15, wherein the providing a notification that the first packet of data is available for processing includes providing the notification to a processing engine in the packet processor.

17. The medium of claim 15, wherein the determining that the first digital signal processor has a first packet of data available includes receiving a signal from the first digital signal processor.

18. An apparatus, comprising:

a first component in a packet processor adapted to (i) determine that a first digital signal processor has a first packet of data available, (ii) obtain the first packet of data from the first digital signal processor, and (iii) determine a priority for the first packet of data; and a second component to (i) provide the first packet of data to memory of a packet processor based, at least in part, on the priority, (ii) provide a notification that the first packet of data is available for processing, and (iii) receive a notification that a second packet of data is available in the packet processor;

wherein the first component is to further (i) determine a channel and a second digital signal processor associated with the second packet of data, and (ii) provide the second packet of data to the channel in the second digital signal processor.

19. The apparatus of claim 18, wherein the first component is a first DMA engine and the second component is a second DMA engine.

20. The apparatus of claim 18, wherein the second component provides the notification that the first packet of data is available for processing by providing the notification to a processing engine in the packet processor.

21. The apparatus of claim 18, wherein the first component determines that the first digital signal processor has a first packet of data available by receiving a signal from the first digital signal processor.

22. A system comprising:

a packet processor including a digital signal processor interface;

a plurality of digital signal processors in communication with the digital signal processor interface; and a modem connectable to one of the digital signal processors, wherein the digital signal processor interface includes:

a first component adapted to (i) determine that a first digital signal processor has a first packet of data available, (ii) obtain the first packet of data from the first digital signal processor, and (iii) determine a priority for the first packet of data; and a second component to (i) provide the first packet of data to memory of a packet processor based, at least in part, on the priority, (ii) provide a notification that the first packet of data is available for processing, and (iii) receive a notification that a second packet of data is available in the packet processor, wherein the first component is to further (i) determine a channel and a second digital signal processor associated with the second packet of data, and (ii) provide the second packet of data to the channel in the second digital signal processor.

23. The system of claim 22, wherein the first component is a first DMA engine and the second component is a second DMA engine.

24. The system of claim 22, wherein the second component provides the notification that the first packet of data is available for processing by providing the notification to a processing engine in the packet processor.

25. The system of claim 22, wherein the first component determines that the first digital signal processor has a first packet of data available by receiving a signal from the first digital signal processor.

* * * * *